United States Patent
Yamamoto

(10) Patent No.: US 8,421,907 B2
(45) Date of Patent: Apr. 16, 2013

(54) IMAGER THAT PHOTOGRAPHS AN IMAGE USING A ROLLING SHUTTER

(75) Inventor: Yasuhiro Yamamoto, Tokyo (JP)

(73) Assignee: Pentax Ricoh Imaging Company, Ltd., Tokyo (JP)

( * ) Notice: Subject to any disclaimer, the term of this patent is extended or adjusted under 35 U.S.C. 154(b) by 323 days.

(21) Appl. No.: 12/814,644

(22) Filed: Jun. 14, 2010

(65) Prior Publication Data
US 2010/0321557 A1    Dec. 23, 2010

(30) Foreign Application Priority Data
Jun. 17, 2009    (JP) .................. 2009-144324

(51) Int. Cl.
H04N 5/232    (2006.01)
(52) U.S. Cl.
USPC ........................................ 348/353
(58) Field of Classification Search .......... 348/222.1, 348/229.1, 230.1, 294, 296, 362, 367, 368, 348/345, 349, 352, 353, 354
See application file for complete search history.

(56) References Cited

U.S. PATENT DOCUMENTS

| | | | |
|---|---|---|---|
| 5,126,849 A * | 6/1992 | Senuma et al. | 348/353 |
| 7,565,077 B2 * | 7/2009 | Rai et al. | 396/335 |
| 8,063,942 B2 * | 11/2011 | Hung et al. | 348/222.1 |
| 8,159,559 B2 * | 4/2012 | Senba | 348/229.1 |
| 2007/0177048 A1 * | 8/2007 | Van Dyke et al. | 348/362 |
| 2008/0055434 A1 * | 3/2008 | Ovsiannikov | 348/246 |
| 2009/0096916 A1 * | 4/2009 | Kim | 348/362 |
| 2009/0102935 A1 * | 4/2009 | Hung et al. | 348/222.1 |
| 2009/0231449 A1 * | 9/2009 | Tzur et al. | 348/208.6 |
| 2009/0231465 A1 * | 9/2009 | Senba | 348/229.1 |
| 2010/0171843 A1 | 7/2010 | Yamamoto | |
| 2010/0265364 A1 * | 10/2010 | Robinson et al. | 348/241 |

FOREIGN PATENT DOCUMENTS

JP    2008-111995    5/2008

OTHER PUBLICATIONS

Yasuhiro Yamamoto, "Imager That Photographs an Image Using a Rolling Shutter", U.S. Appl. No. 12/814,639, filed Jun. 14, 2010, PP.

* cited by examiner

Primary Examiner — Nicholas Giles
(74) Attorney, Agent, or Firm — Greenblum & Bernstein, P.L.C.

(57) ABSTRACT

An imager is provided having an imaging sensor and a focusing detector. The imaging sensor outputs image signals that have charges stored in one line of pixels. The focusing detector detects whether a subject image is in focus on said imaging sensor based on contrast values of frame image data for one image frame formed by the image signals. The imaging sensor changes a charge-storing period that is a time period for storing charges in a pixel, and lengthens the charge-storing period in the case of taking pictures under photographing conditions in which movement of a subject is expected.

4 Claims, 5 Drawing Sheets

READING RESULT OF mth LINE

READING RESULT OF m+1th LINE

READING RESULT OF mth LINE

READING RESULT OF m+1th LINE

IMAGER THAT PHOTOGRAPHS AN IMAGE USING A ROLLING SHUTTER

BACKGROUND OF THE INVENTION

1. Field of the Invention

The present invention relates to an imager comprising an imaging sensor that captures an image using a rolling shutter.

2. Description of the Related Art

A well known imaging sensor used for capturing images has photodiodes arranged on a two-dimensional plane.

For example, a CMOS imaging sensor is one such imaging sensor. A conventional contrast AF procedure uses a contrast value from image data output by the CMOS imaging sensor to determine whether a photographing lens is focused on a subject. Focusing conditions are determined from contrast values in an AF region that is virtually provided on the CMOS imaging sensor.

However, in the case that focusing conditions change while the CMOS imaging sensor is outputting image data, the output image data becomes distorted so that it may not be determined properly whether a photographing lens is focused on a subject.

SUMMARY OF THE INVENTION

An object of the present invention is to provide an imager that can focus on a subject with a contrast AF procedure even when the subject is not stationary.

An imager is provided having an imaging sensor and a focusing detector. The imaging sensor outputs image signals that have charges stored in one line of pixels. The focusing detector detects whether a subject image is in focus on said imaging sensor based on contrast values of frame image data for one image frame formed by the image signals. The imaging sensor changes a charge-storing period that is a time period for storing charges in a pixel, and lengthens the charge-storing period in the case of taking pictures under photographing conditions in which movement of a subject is expected.

BRIEF DESCRIPTION OF THE DRAWINGS

The objects and advantages of the present invention will be better understood from the following description, with references to the accompanying drawings in which.

DESCRIPTION OF THE PREFERRED EMBODIMENTS

Figure 1:
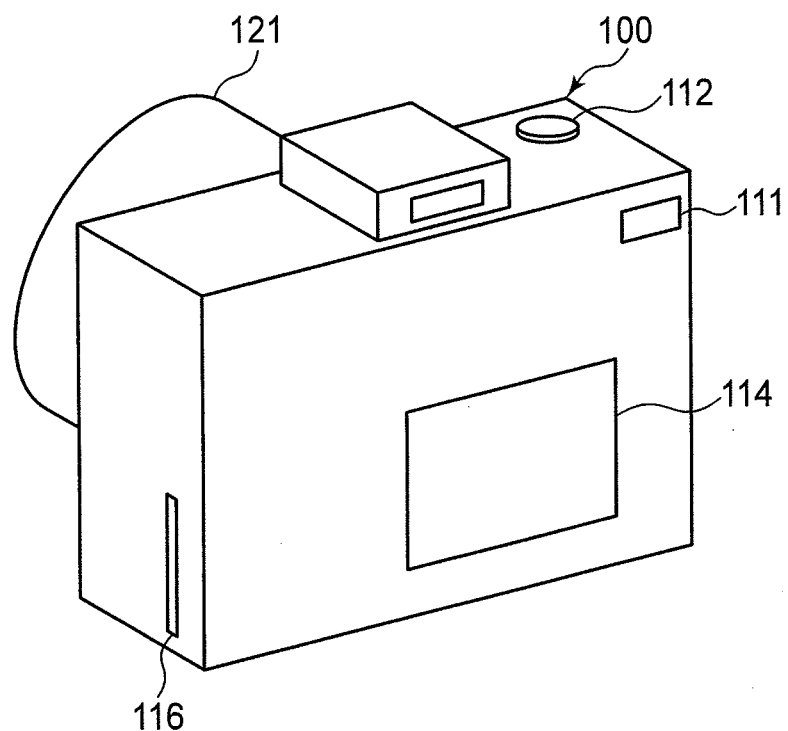
FIG. 1 is a perspective view of an imager as seen from its rear surface according to the embodiment of the present invention.

The present invention is described below with references to the embodiment shown in the drawings. FIG. 1 shows a digital camera 100 that is an imager according to this embodiment. For example, the digital camera is a compact camera.

The digital camera 100 is equipped with a main power switch 111 that activates and deactivates a main power source, a release button 112, an LCD monitor 114, a card slot 116, and an imaging lens 121 projecting from the front surface of the digital camera. The main power switch 111 and the release button 112 are comprised of an operation switch 110.

The main power switch 111 is a momentary switch projecting from the back surface of the digital camera 100.

The release button 112 is a two-step momentary switch that is provided on the top of the digital camera 100. In the case that a user depresses the release button 112 halfway, the digital camera carries out photometry and distance surveying processes. In the case that a user fully depresses the release button 112, the digital camera captures an image.

The LCD monitor 114 is rectangular-shaped with the same 3:4 aspect ratio as a photographed image. As illustrated in FIG. 1, it is a rectangle of which the long sides extend in the longitudinal direction of the digital camera 100, and it is provided near the center on the back surface of the digital camera 100. It displays a through image and an image obtained through the photographing lens 121, a photographed image, and configuration settings of the digital camera 100.

Figure 2:
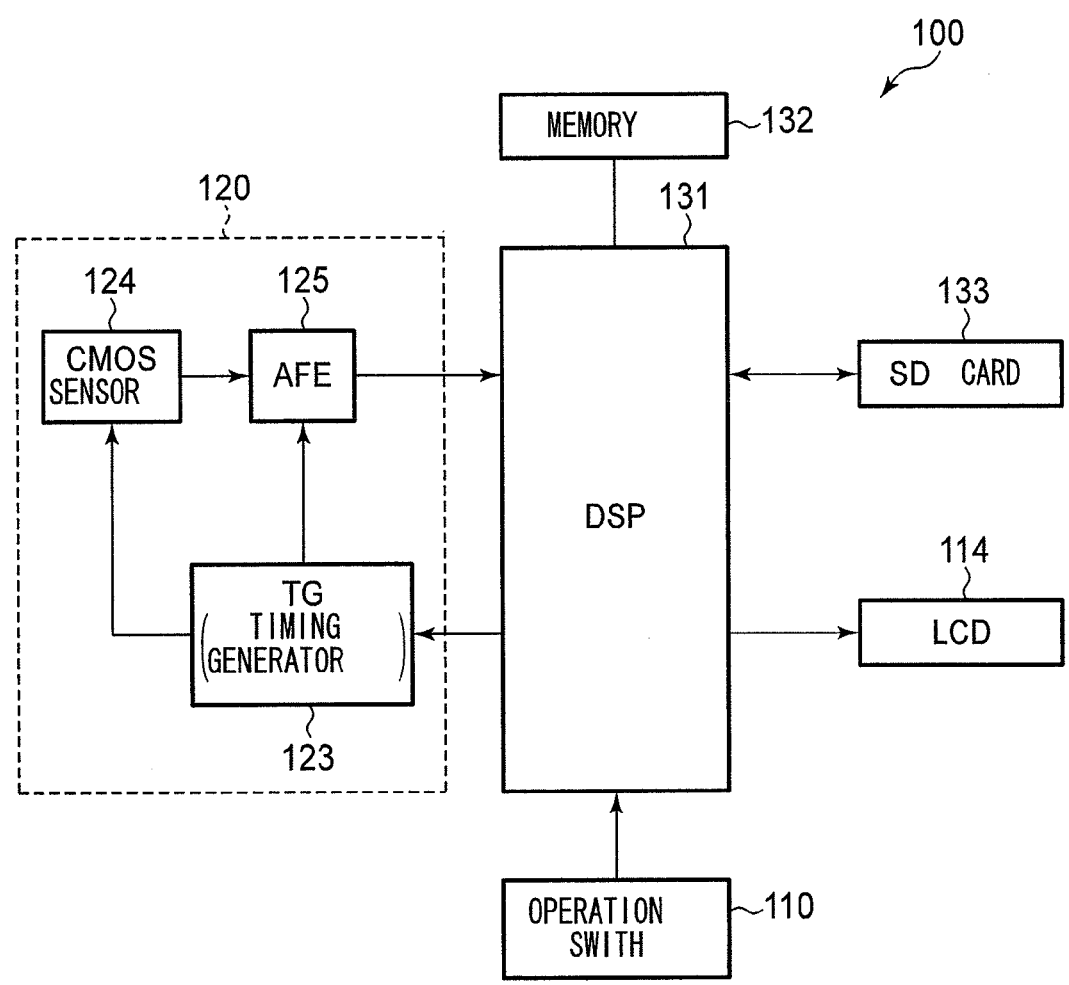
FIG. 2 is a block diagram of the imager.

Components provided in the digital camera are described with reference to FIG. 2. The digital camera 100 mainly comprises a DSP 131 that controls the operation of the digital camera 100, the operation switch 110 that is used for operating the digital camera 100, an imaging unit 120 that converts a subject image to a digital image signal, a memory 132 that stores data sent from the DSP 131, a SD card 133 that stores a photographed image, and the LCD monitor 114.

The imaging unit 120 mainly comprises a CMOS imaging sensor 124, an AFE (Analog Front End) 125, and a timing generator 126.

The CMOS imaging sensor 124 has an imaging area 124a in which an incoming subject image is converted to an analog image signal. The imaging lens 121 brings a subject image into focus on the imaging area 124a. The imaging area 124a is rectangular-shaped and provided in the digital camera 100 so that the long side of the imaging area 124a is coincident with the direction from right to left in FIG. 1 and the short side of the imaging area 124a is coincident with the direction from top to bottom in FIG. 1. Multiple pixels comprising photodiodes are aligned on the imaging area 124a. Pixels aligned in the long direction are referred to as a line and pixels aligned in the short direction are referred to as a row, hereinafter.

The CMOS imaging sensor 124 reads charges stored in the pixels for each line, and outputs them as analog image signals to the AFE 125. The period for storing charges in the pixels is decided by the user. The AFE 125 converts an analog image signal to a digital image signal after adjusting the gain of the analog image signal, and then sends the digital image signal to the DSP 131.

The CMOS imaging sensor 124 uses a rolling shutter to output analog image signals. The rolling shutter is a kind of signal-reading procedure that outputs an analog image signal for each line of the CMOS imaging sensor 124, i.e. for each group of pixels aligned in the long direction. The CMOS imaging sensor 124 according to the embodiment outputs an analog image signal in the scanning direction that runs from the top to the bottom of the imaging area 124a.

The timing generator 126 sends a timing signal to both the CMOS imaging sensor 124 and the AFE 125 based on signal from the DSP 131. The CMOS imaging sensor 124 and the AFE 125 operate on the basis of the timing signal.

Before imaging, the DSP 131 carries out a photometry process for a subject using a quantity of light from the subject image that is included in the digital image signal. It calculates an exposure value from a photometry value and then calculates the shutter speed and aperture value that are used in photographing. After that, a photograph is taken based on the calculated shutter speed and aperture value. The DSP 131 controls the photographing lens 121 using the received digital image signal, and the subject image is brought into focus on the imaging area 124a of the CMOS imaging sensor.

After receiving a digital image signal from the AFE 125, the DSP 131 processes the digital image signal and creates frame image data, which contains the data of one frame of an image. The frame image data is stored in the SD card 133 and displayed on the LCD monitor 114 as a through image. The memory 132 is used as a working memory in which intermediate data are temporarily stored while the DSP 131 makes calculations and carries out image processing.

The digital camera 100 comprises multiple photographing modes. The photographing modes include a sports mode used for photographing a subject with fast movements, a kids mode for photographing a child, and a landscape mode for photographing distant landscapes and broad ranges, etc. The kids mode is configured for photographing a person with frequent movements because children move frequently.

Figure 3:
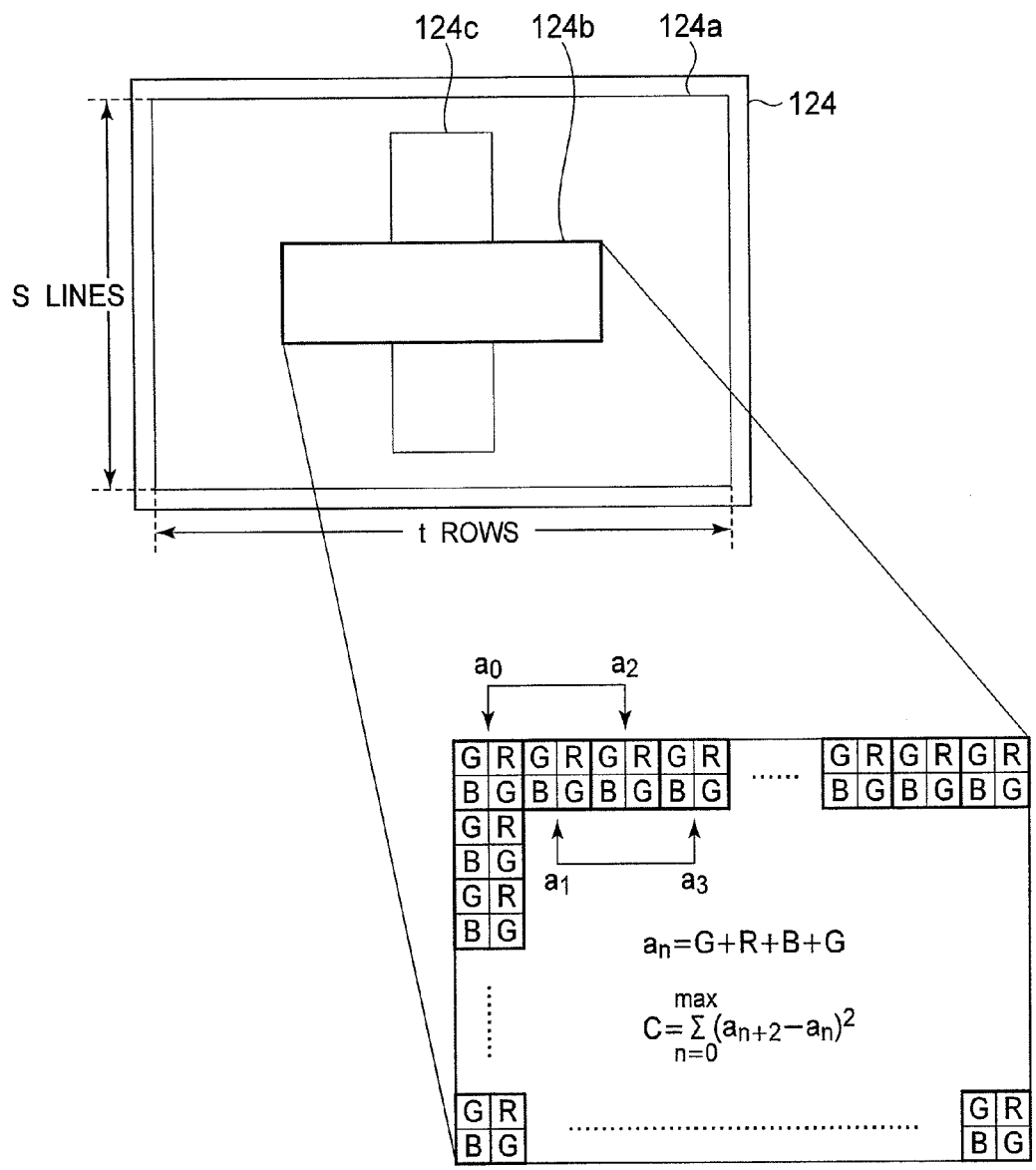
FIG. 3 is a front view of an imaging sensor.

Referring to FIG. 3, the plurality of pixels in the imaging area 124a is aligned in s lines and t rows based on a Bayer arrangement. The DSP 131 virtually provides a transversal AF area 124b and a longitudinal AF area 124c on the imaging area 124a of the CMOS imaging sensor 124. The transversal AF area 124b is a rectangular region at the center of the imaging area 124a in the vertical direction that extends in the horizontal direction, i.e. the lengthwise direction of the CMOS imaging sensor 124, and has multiple rows. The transversal AF area 124b extends orthogonally in the scanning direction. The longitudinal AF area 124c is a rectangular region at the center of the imaging area 124a in the lengthwise direction that extends in the vertical direction of the CMOS imaging sensor 124 and has multiple rows. The longitudinal AF area 124c extends along the scanning direction. The transversal AF area 124b is orthogonal to the longitudinal AF area so that their centers overlap. The center of the imaging area 124a overlaps the center of the transversal AF area 124b and the center of the longitudinal AF area. The DSP 131 moves a focusing optical system to bring the photographing lens 121 into focusing position based on a contrast AF process.

In the contrast AF process, the DSP 131 calculates the contrast value C based on the brightness of pixels located in the transversal AF area 124b and the longitudinal AF area 124c, where the highest average contrast value C is determined to be the in-focus position at which the focusing optical system is brought into focus.

An example of the brightness calculation process applied to pixels in the transversal AF area 124b is described hereinafter.

The brightness is calculated for each block that has multiple pixels. A block comprises four pixels with two pixels in the horizontal direction and two pixels in the vertical direction. These four pixels form a two-by-two square matrix. A block according to the Bayer matrix comprises one red pixel, two green pixels and one blue pixel. The brightness "AN" is calculated, as described below, by summation of the digital image signal output by the four pixels.

$$AN = G + R + B + G$$

where G is the value of the digital image signal output by each green pixel, R is the value of digital image signal output by the red pixel, and B is the value of the digital image signal output by the blue pixel.

Next, the difference between the brightness "AN" and the brightness AN+2 of the block one block removed in the horizontal direction is calculated, and the difference between the two brightness values is squared. This calculation is processed for all pixels and the calculated values are then summed together. By this means, the contrast value C is calculated. That is, the contrast value C is calculated using the formula below.

$$C = \sum_{n=0}^{max} (a_{n+2} - a_n)^2$$

The contrast value in the vertical direction is calculated in a similar manner by replacing lines with rows and rows with lines in the above-mentioned calculation.

The SD card 133 is detachably stored in the card slot 116 provided on the side surface of the digital camera 100. A user can change the SD card 133 by accessing it from the exterior of the digital camera 100.

In the case of photographing a subject whose condition changes with the passage of time, the condition of the subject may change before the charges stored in all lines are output. The moment for storing a charge in each pixel is different for each line, because the CMOS imaging sensor 124 outputs analog image signals using a rolling shutter. Therefore, an image output by the CMOS imaging sensor 124 may distorted.

Figure 4:
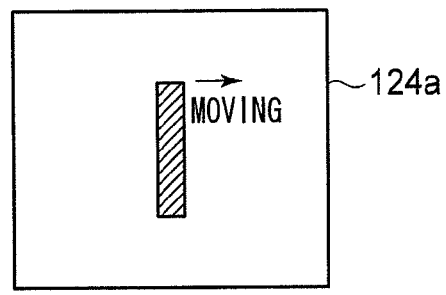
FIG. 4 is another front view of an imaging sensor.

Distortion of an output image is described in detail hereinafter with references to FIGS. 4 and 5. FIG. 4 shows a subject that extends in the vertical direction of the imaging area 124a with movement to the right in the horizontal direction of the imaging area 124a.

Figure 5:
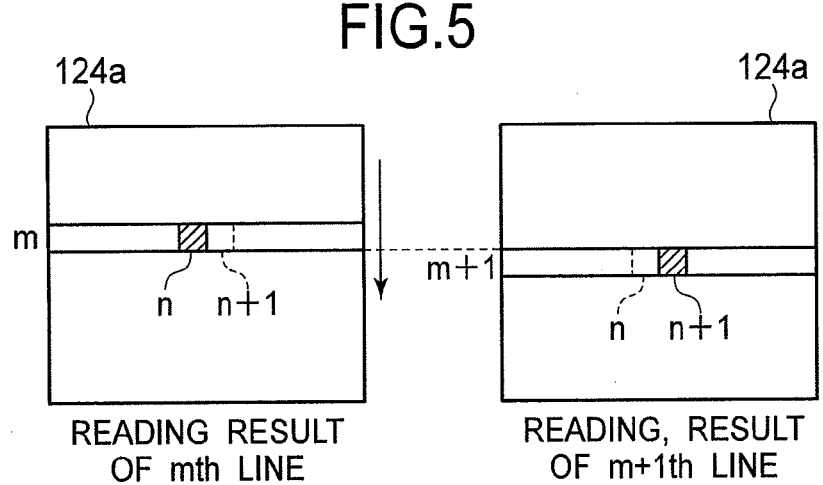
FIG. 5 shows charge reading results of a line during a normal charge-storing period.

FIG. 5 shows the result obtained from reading charges in a case where the period for storing a charge in a pixel (charge-storing period) is the same as the period of time required to read all of the pixels in a line. In this particular situation the subject moves from the moment the CMOS imaging sensor 124 outputs an analog image signal derived from the pixels provided in the (m)th line until the moment that the CMOS imaging sensor 124 outputs an analog image signal of pixels provided in (m+1)th line. Therefore, a subject image projected on the (n)th row when the charge of the (m)th line is output moves to the (n+1)th row when the charge of the (m+1)th line is output. Therefore, a rectangular-shaped subject is photographed with distortion in the horizontal direction. The reliability of the contrast value of a subject image in the vertical direction is reduced because the subject image is distorted.

Figure 6:
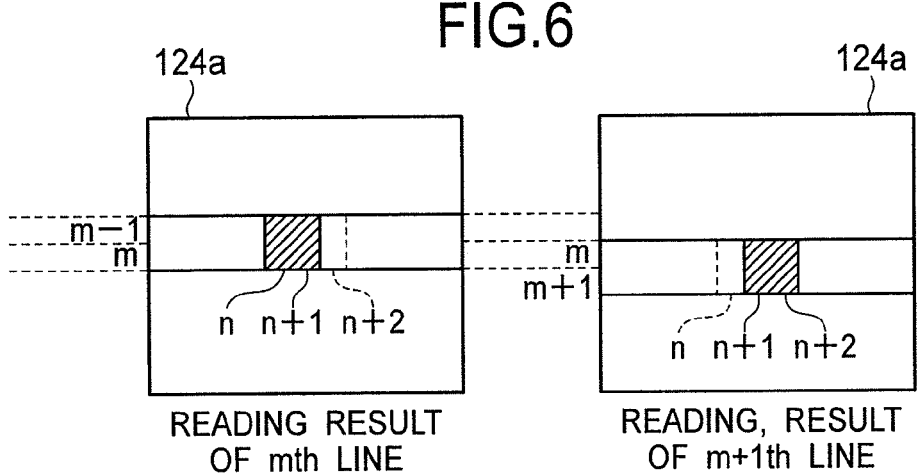
FIG. 6 shows charge reading results of a line during a charge-storing period that is longer than a normal charge-storing period.

FIG. 6 shows a charge-reading result in the case that the charge-storing period is the same as the period of time required for reading all of the pixels in two lines. In this case, the charge-storing period is twice as long as the period shown in FIG. 5. The length of a subject image in the horizontal direction of the imaging area 124a becomes longer than the length of a subject image shown in FIG. 5 because the subject moves while the CMOS imaging sensor 124 stores charges in the pixels provided in the (m−1)th and (m)th lines. That is, a subject image is output by pixels provided in (m−1)th line and (n)th row, (m−1)th line and (n+1)th row, (m)th line and (n)th row, and (m)th line and (n+1)th row. A subject moves further while the CMOS imaging sensor 124 stores charges in the pixels provided in the (m)th and (m+1)th lines, with the subject image then derived from pixels in the (m−1)th line and (n)th row, (m−1)th line and (n+1)th row, (m)th line and (n)th row, and (m)th line and (n+1)th row. A subject image obtained from the present scan overlaps with a subject image obtained from the previous scan in the (n+1)th line. The scanning corresponds to outputting a charge for one line. Therefore, the correlation between charges read from the lines shown in FIG. 6 is stronger than that of FIG. 5, so that the reliability of the contrast value in the vertical direction does not deteriorate. Note that the charge-storing period is not limited to the period for reading two lines, it may be arbitrarily changed.

Figure 7:
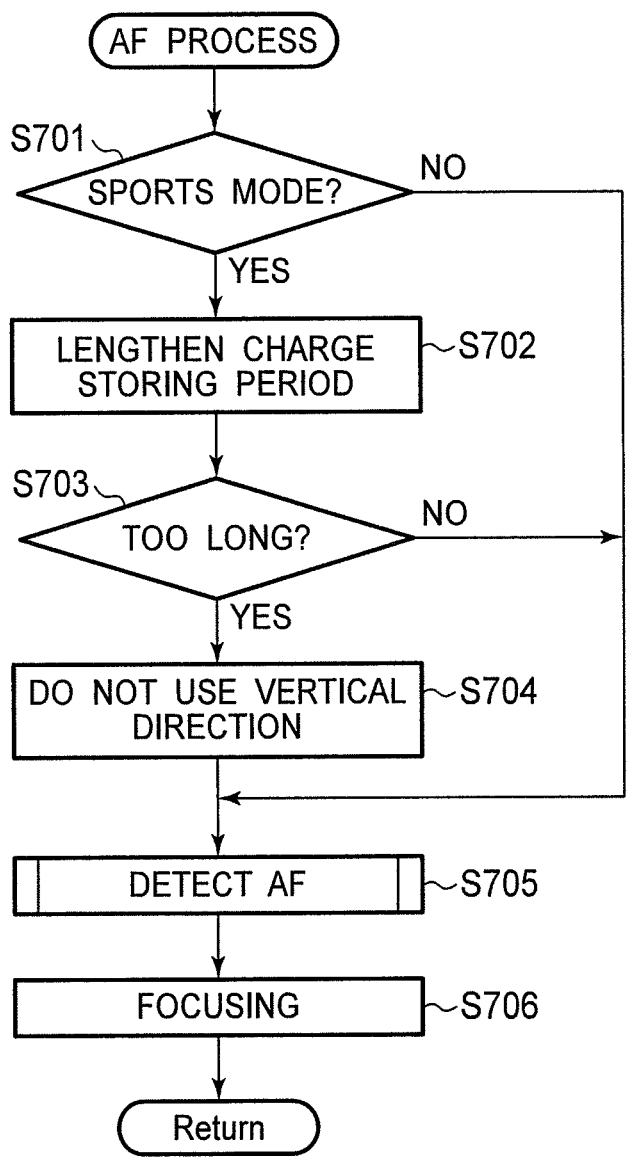
FIG. 7 is a flowchart of an AF process.

The AF process carried out when the release button 112 is depressed halfway is described with reference to FIG. 7.

In Step S701, the DSP 131 determines whether the present photographing mode of the digital camera 100 is a photographing mode appropriate for use when a subject image moves quickly. Such a photographing mode would be either the sports mode or kids mode. In the case that the present photographing mode of the digital camera 100 is such a photographing mode, the process proceeds to Step S702, otherwise it proceeds to Step S705.

In Step S702, the CMOS imaging sensor 124 extends the charge-storing period of pixels and outputs an analog image signal. At the same time, the number of scanning lines for one time period is based on the present photographing mode. For example, the sports mode has three scanning lines and the kids mode has two scanning lines. That is, the charge-storing period of the sports mode is the same as the charge-reading period that corresponds to three lines, and the charge-storing period of the kids mode is the same as the charge-reading period that corresponds to two lines.

In Step S703, whether the charge-storing period exceeds a certain value is determined. In the case that it exceeds a certain value, the process continues on to Step S704, otherwise it proceeds to Step S705. In the case where a charge-storing period is increased too much when the digital camera 100 photographs a subject with a large quantity of light, overexposure occurs. To prevent overexposure, the charge-storing period is limited to a certain maximum value.

In Step S704, the DSP 131 is configured to determine whether the photographing lens 121 is focused on the basis of the contrast value C from only the transversal AF area 124b, without consideration of the contrast value C from the longitudinal AF area 124c.

In Step S705, the DSP 131 determines the focusing position of the photographing lens 121 using either the contrast value C based on the long charge-storing period or the contrast value C from only the transversal AF area 124b based on the determination in the Step S703. In Step S706, the DSP 131 moves the focusing optical system to the focusing position.

According to the embodiment, the photographing lens 121 focuses a subject image on the CMOS imaging sensor 124 in a stable manner without distortion caused by movement of a subject image.

Note that, the DSP 131 is not limited to using the transversal AF area 124b and the longitudinal AF area 124c, and may instead determine focusing an AF area provided in any position on the imaging area 124a.

The scanning direction of the CMOS imaging sensor 124 is not limited to the direction from top to bottom.

The contrast value C may be calculated using an image signal from all pixels. Alternatively, contrast value C may be calculated based on either the brightness "AN" of each block that is obtained through segmentation of the photographing area 124a, the brightness "AN" of group of pixels or blocks provided with certain spacing, or the brightness "AN" of multiple pixels that are arranged in the vicinity of the center of the photographing area 124a. Alternatively, the contrast value C is calculated after calculating the brightness "AN" of multiple pixels provided in the vicinity of the center of the photographing area 124a.

In Step S702, the number of scanning lines for one time period may be decided based on the movement of a subject in a through image. That is, in the case where a difference that exists between each frame of a through image is larger than a certain value, the movement of a subject is determined to be fast and the charge-storing period is lengthened accordingly, but in the case where the difference is smaller than the certain value the movement of a subject is determined to be slow and the charge-storing period is shortened accordingly.

The imaging sensor is not limited to the CMOS imaging sensor 124, and may be a CCD imaging sensor, etc.

The contrast value C is not limited to being calculated with brightness "AN", and may instead be calculated with any one of G, R, B signals. Additionally, the contrast value C is calculated for each line provided in the transversal AF area 124b and for each line provided in the longitudinal AF area 124c, and focusing of the photographing lens 121 is determined by the summation of the contrast values C for each line.

Although the embodiment of the present invention has been described herein with references to the accompanying drawings, obviously many modifications and changes may be made by those skilled in the art without departing from the scope of the invention.

The present disclosure relates to subject matter contained in Japanese Patent Application No. 2009-144324 (filed on Jun. 17, 2009), which is expressly incorporated herein, by reference, in its entirety.

The invention claimed is:

1. An imager comprising:
   an imaging sensor that outputs image signals that have charges stored in one line of pixels; and
   a focusing detector that detects whether a subject image is in focus on said imaging sensor based on contrast values of image data for one image frame formed by the image signals;
   wherein said imaging sensor lengthens a charge-storing period, which is a time period for storing charges in a pixel, when a picture is taken under a photographing condition in which movement of a subject is expected,
   wherein said imaging sensor comprises pixels that are aligned in the horizontal and vertical directions, and the image data for one line is read in the horizontal direction of said imaging sensor, and
   said focusing detector detects whether a subject image is in focus on said imaging sensor based on contrast values in the horizontal direction, and not based on contrast values in the vertical direction, when the charge-storing period is longer than a predetermined value.

2. The imager according to claim 1, further comprising multiple photographing modes that are selectable by a user according to a subject, wherein the photographing condition corresponds to a photographing mode in which movement of a subject is expected.

3. The imager according to claim 1, further comprising a comparator that calculates a differential between first frame image data output by said imaging sensor and second frame image data output by said imaging sensor immediately after the first frame image data is output, and determines whether the differential is larger than a first threshold value, and
   wherein the photographing condition is present when said comparator determines that the differential is larger than the first threshold value.

4. The imager according to claim 1, wherein said imaging sensor outputs an image signal using a rolling shutter, with which said imaging sensor reads charges for every line in the vertical direction.

\* \* \* \* \*